Nov. 16, 1954  R. GOUIRAND  2,694,368
PNEUMATIC RAILWAY TRUCK
Filed Aug. 11, 1948  2 Sheets-Sheet 1
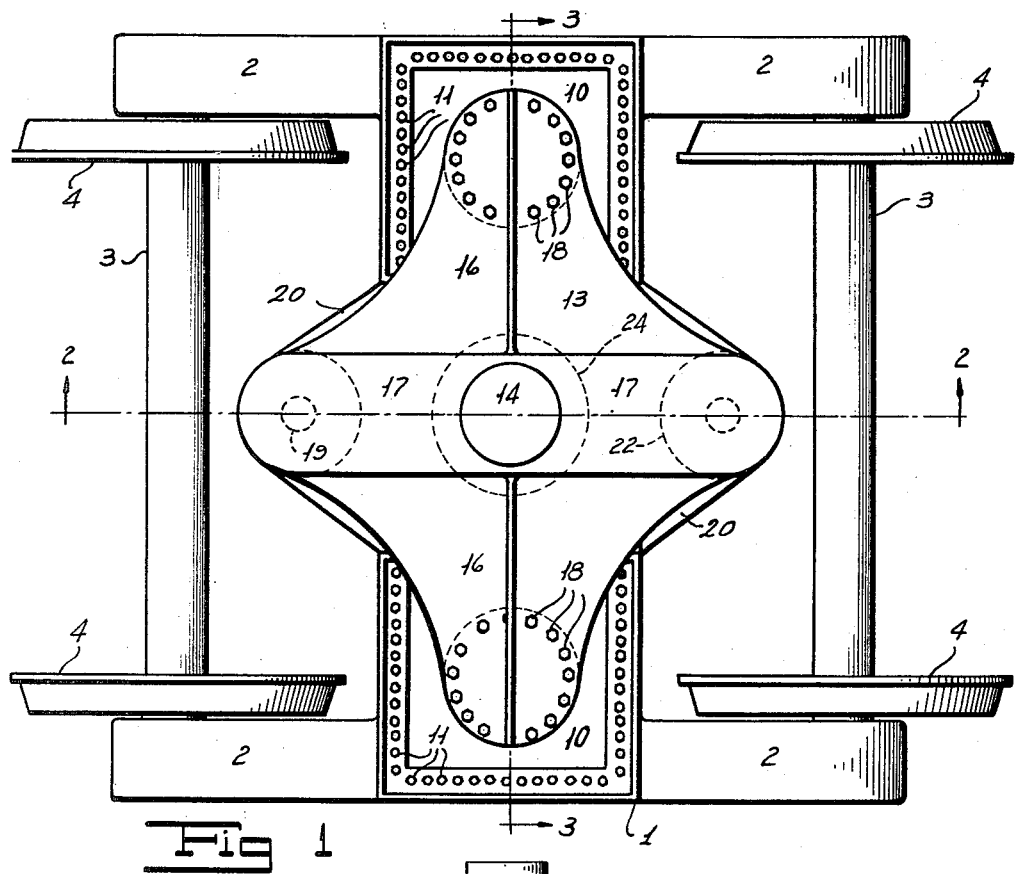
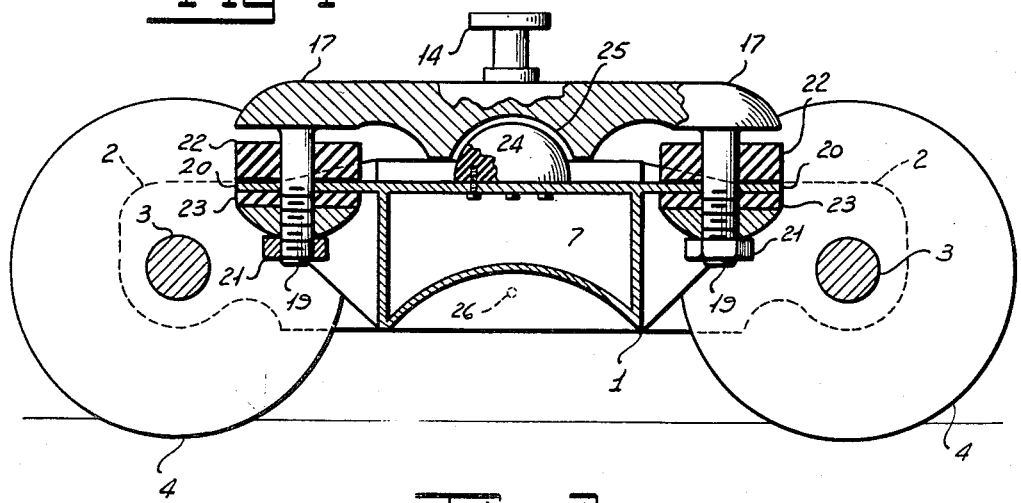
INVENTOR
RENE GOUIRAND
BY *Cornelius Zabriskie*
ATTORNEY Nov. 16, 1954 R. GOUIRAND 2,694,368
PNEUMATIC RAILWAY TRUCK
Filed Aug. 11, 1948 2 Sheets-Sheet 2
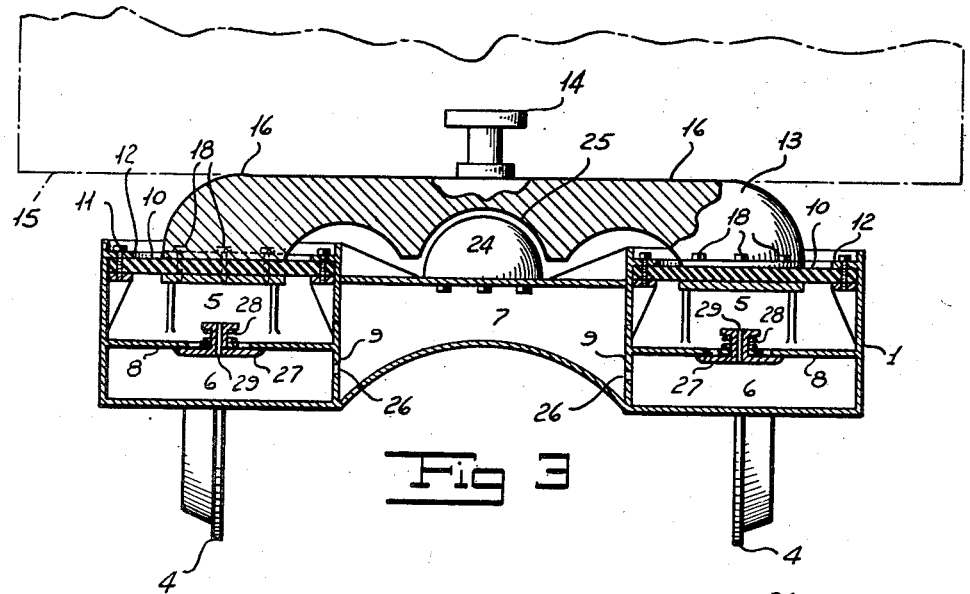
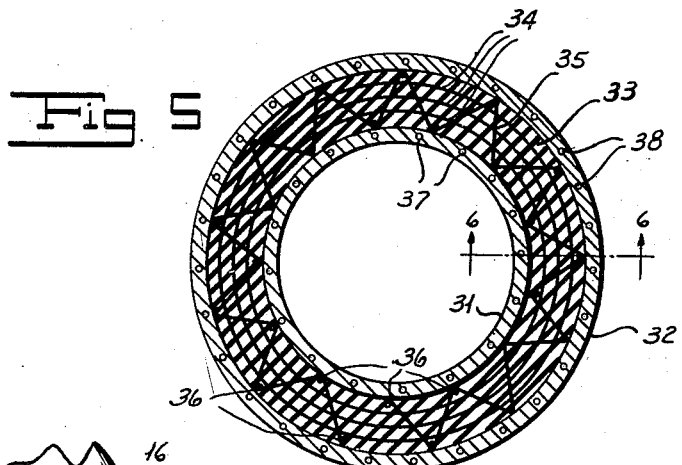
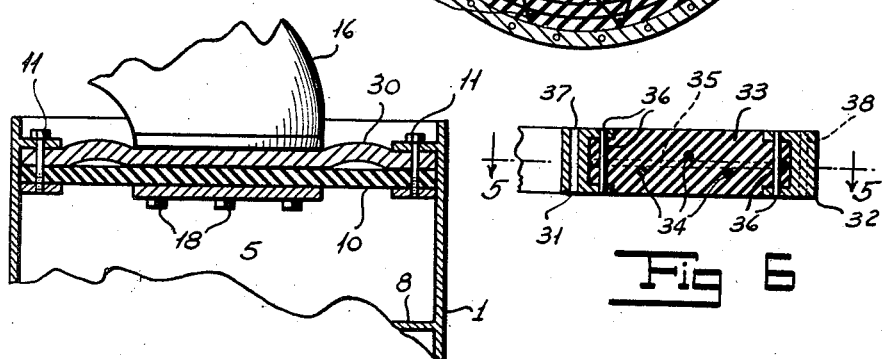
INVENTOR
RENE GOUIRAND
BY *Cornelius Zabriskie*
ATTORNEY

United States Patent Office 2,694,368
Patented Nov. 16, 1954

2,694,368

PNEUMATIC RAILWAY TRUCK

Rene Gouirand, New York, N. Y.

Application August 11, 1948, Serial No. 43,580

4 Claims. (Cl. 105—197)

This invention is a pneumatic suspension for railway cars and relates, more particularly, to a novel truck construction for such cars.

The object of the invention is to greatly simplify railway car truck construction, to eliminate all mechanical springs and to utilize in their stead a novel arrangement of pneumatic cushions adapted to efficiently carry the loads imposed thereon and effect easy riding of the coach or other car supported on such trucks.

Speaking generally, the present invention comprises a truck provided at the opposite sides of its longitudinal medial plane with pneumatic supporting devices, preferably in the form of diaphragms covering compression chambers formed in the truck, and above the truck is mounted a bolster secured to the respective diaphragms and carrying a king pin to mount it for pivotal movement beneath a car body. The disposition of the pneumatic devices on opposite sides of the central plane of the truck effectually supports the bolster against lateral tilting movement. Relative movement between the bolster and truck in every horizontal direction is precluded by limiting posts connecting the bolster to the truck.

Features of the invention, other than those adverted to, will be apparent from the hereinafter detailed description and claims, when read in conjunction with the accompanying drawings.

The accompanying drawings illustrate different practical embodiments of the invention, but the constructions therein shown are to be understood as illustrative, only, and not as defining the limits of the invention.

Figure 1 is a plan view of a truck embodying the present invention.

Figure 2 is a longitudinal section on the line 2—2 of Figure 1.

Figure 3 is a transverse section on the line 3—3 of Figure 1.

Figure 4 is a fragmental view corresponding to the showing of Figure 3, but illustrating a modified construction of the weight carrying diaphragm.

Figure 5 is a horizontal section through a modified diaphragm element, this section being taken on the line 5—5 of Figure 6.

Figure 6 is a transverse section taken on the line 6—6 of Figure 5.

Referring to the drawings, 1 designates, generally, a truck preferably fabricated from structural members welded together, although the truck may be in the form of a casting if so desired. This truck is provided at its opposite sides with forwardly and rearwardly extending parallel arms 2 which carry axles 3. These axles are supported in the arms 2 in any appropriate journals or anti-friction bearings, as is common in the art, and each of the axles is rigid with a pair of flanged wheels 4 as usual.

The body of the truck is internally partitioned to divide it into a series of chambers 5, 6 and 7. The compression chambers 5 are superimposed over the auxiliary chambers 6 at the opposite sides of the truck, while the equalizing chamber 7 is positioned centrally of the truck. The chambers 5 and 6 are separated by rigid partitions 8 and these chambers are separated from chamber 7 by rigid partitions 9. The chamber 7 is closed at its top and bottom by rigid walls, but the chambers 5 are closed at their tops by elastic weight carrying diaphragms 10. Each of these diaphragms may be made of solid rubber, but is preferably constructed after the manner of an automobile tire shoe by vulcanizing within a rubber slab, cords or fabric, so as to impart to the diaphragm sufficient strength. Both diaphragms are shown as square, although they may be round, polygonal or any other desired shape. In any event, they are marginally secured by means of bolts 11 to flanges 12 projecting inwardly from the side walls of the chamber 5, so that, when these diaphragms are bolted in place as described, they will serve to seal the tops of said chambers 5.

Positioned above and bearing upon the diaphragms 10 is a bolster 13. This yoke is provided centrally with an upstanding king pin 14 by means of which the bolster is mounted for pivotal movement under the car body 15, indicated in dot and dash lines in Figure 3. Any appropriate fifth wheel bearing may be interposed between the body and the bolster.

The bolster is so formed as to embody two laterally projecting arms 16 and two arms 17 which project longitudinally of the truck. The laterally projecting arms 16 are adapted to bear upon and are secured to the centers of the diaphragms 10 by means of bolts 18, while the arms 17 are provided near their outer ends with depending threaded posts 19. These posts extend downwardly through the platform 20 of the truck and nuts 21 are affixed at their lower ends. Cushioning members 22 and 23, preferably all rubber, embrace the posts 19 and are positioned respectively above and below the platform 20 to act as cushions and snubbers. A dome-like cushion 24 of rubber or other resilient material is preferably fixed centrally of the platform below the king pin and the under side of the bolster may be hollowed, as shown at 25 in Figures 2 and 3, to cooperate with this cushion 24. The purpose of the cushion 24 is to take up excessive shocks received by the wheels by directly transmitting the shocks to the bolster, whereby undue strains on the diaphragms are avoided. Furthermore, should either of the diaphragms become inoperative after long periods of use or by accident, the cushion 24 will carry the weight of the car until repairs can be made.

In practice, air is introduced into the chambers 5, 6 and 7 through any appropriate inlet or inlets and this air is placed under sufficient pressure to carry the weight imposed upon the diaphragms by the car body. It will be noted that the chambers 6 and 7 are connected by passages or perforations 26, so that air in all of these chambers 6 and 7 will ordinarily be equalized.

In each of the partitions 8 is a check valve 27 controlled by a spring 28. This spring is strong enough to normally keep these check valves closed, but, in the event of severe shock in either chamber 5, the corresponding check valve will be opened by the pressure thus generated to permit the escape of some of the pressure into the corresponding auxiliary chamber 6. As soon as the shock has passed, pressure between the chambers 5 and 6 may be equalized by return of the air to the chamber 5 through a constricted passage 29 axially of the check valve as shown in Figure 3.

With a structure constituted as described, the weight of the car body will be carried on the two diaphragms 10, back of which the air pressure will be maintained, by virtue of the passages described, in a state of equilibrium. These diaphragms will take up the road shocks, so that they will not be transmitted to the car, although very serious shocks, such as might occur when the wheels pass over an object on the track, are taken by the cushions 24 and 22 which protect the diaphragms from damage.

I have hereinbefore referred to the diaphragms as constructed from rubber slabs in which were embedded cord or fabric vulcanized in place. Figure 4 shows a modified form of construction, wherein the diaphragm 10 may be in the form of a pure rubber slab backed up by a slab 30 which may be of fabric or fabric or cord vulcanized in rubber.

A very strong and long lived form of diaphragm is shown in Figures 5 and 6. It is here shown as circular although it may be of any shape. In these views a pair of concentric steel rings 31 and 32 of channel section have interposed between them an annular rubber slab which may be of pure rubber or may have vulcanized therein cord or fabric. Within this rubber slab 33 is embedded a spiral coil of wire or a plurality of wire hoops 34 concentric with one another and with the rings 31 and 32 and spaced apart in a radial direction. Also embedded in the rubber is a serpentine wire 35 which extends between the rings 31 and 32 and about anchorage pins 36 extending across the channels of each of the rings, as shown best in Figure 6. The serpentine wire 35 may be interlaced with respect to the wire or hoops 34 and, if desired, may be welded thereto, although this is not necessary. When the rubber body 33 is vulcanized into the rings 31 and 32, with the wires embedded therein as stated, an extremely strong and durable diaphragm will result. Perforations 37 and 38 shown in the rings 31 and 32 in Figure 5 are to receive the bolts 11 and 18, respectively, for attaching the diaphragm to the carriage and to the yoke. The serpentine wire 35 is shown in Figure 5 as drawn taut between the rings as it zigzags back and forth between them. However, in practice, this wire may be made in truly serpentine form or otherwise so that it will be somewhat slack and thus permit the diaphragm to more readily flex.

In the truck of this invention, the weight of the car body is carried by the elastic diaphragms 10, supported from beneath by air under sufficient pressure to permit them to carry this weight. The posts 19 connect the truck to the bolster to preclude both longitudinal and lateral relative movement between the bolster and the truck and thus relieve the diaphragms of these horizontal strains.

The foregoing detailed description sets forth the invention in its preferred practical forms, but the invention is to be understood as fully commensurate with the appended claims.

Having thus fully described the invention, what I claim as new and desire to secure by Letters Patent is:

1. An assembly of the character described comprising: a truck having a hollow portion, the interior of which is partitioned to provide within itself at the opposite sides thereof compression chambers with subjacent auxiliary chambers and to also provide a common medial equalizing chamber, the partitions between the auxiliary chambers and the equalizing chamber having therein constricted air passages, the partitions between the compression chambers and the auxiliary chambers being provided with check valves with constricted passages therethrough and the tops of said compression chambers being sealed by flexible diaphragms, and a bolster extending transversely of the truck and the under sides of the opposite ends of which are secured centrally to the flexible diaphragms.

2. An assembly of the character described as claimed in claim 1, wherein all of the walls and partitions of all of the chambers except the flexible diaphragms are rigid and metallic.

3. An assembly as claimed in claim 1, wherein the check valves between the compression chambers and the auxiliary chambers are held by springs of sufficient strength to normally seat the check valves against rapid flow of air under pressure from the compression chambers into the auxiliary chambers and are adapted to be unseated to permit rapid passage of air under pressure to the auxiliary chambers in the event of abnormal shocks, the passages through said check valves permitting equalization of pressure between the compression chambers and their auxiliary chambers after the shock has passed.

4. An assembly as claimed in claim 1, wherein there is a dome-like elastic bumper interposed between and positioned centrally of the truck and the bolster and mounted on one of them to act against the other.

References Cited in the file of this patent

UNITED STATES PATENTS

| Number | Name | Date |
|---|---|---|
| 295,417 | Milne | Mar. 18, 1884 |
| 443,112 | Randall | Dec. 23, 1890 |
| 811,622 | Downer | Feb. 6, 1906 |
| 850,387 | Mather | Apr. 16, 1907 |
| 1,008,290 | Verge | Nov. 7, 1911 |
| 1,374,780 | Thompson | Apr. 12, 1921 |
| 1,536,139 | Priebe | May 5, 1925 |
| 1,790,206 | Farmer | Jan. 27, 1931 |
| 1,885,457 | Lord et al. | Nov. 1, 1932 |
| 2,023,135 | Hawkins | Dec. 3, 1935 |
| 2,076,722 | Heinze | Apr. 13, 1937 |
| 2,190,762 | Anderson | Feb. 20, 1940 |
| 2,288,383 | Anderson | June 30, 1942 |
| 2,509,955 | Barnes | May 30, 1950 |